US010647009B2

(12) United States Patent
Cao et al.

(10) Patent No.: US 10,647,009 B2
(45) Date of Patent: May 12, 2020

(54) ROUTING UNIT, A ROTARY JOINT AND A ROBOT

(71) Applicant: ABB Schweiz AG, Baden (CH)

(72) Inventors: Kaiyuan Cao, Shanghai (CN);
Jianqiang Jia, Shanghai (CN);
Xiaodong Cao, Shanghai (CN);
Huafeng Mao, Shanghai (CN)

(73) Assignee: ABB Schweiz AG, Baden (CH)

( * ) Notice: Subject to any disclaimer, the term of this patent is extended or adjusted under 35 U.S.C. 154(b) by 329 days.

(21) Appl. No.: 15/468,660

(22) Filed: Mar. 24, 2017

(65) Prior Publication Data
US 2017/0197319 A1    Jul. 13, 2017

Related U.S. Application Data (63) Continuation of application No. PCT/CN2014/087489, filed on Sep. 26, 2014.

(51) Int. Cl.
*B25J 17/00*   (2006.01)
*B25J 17/02*   (2006.01)
(Continued)

(52) U.S. Cl.
CPC .......... *B25J 19/0029* (2013.01); *H02G 11/02* (2013.01); *H02K 7/116* (2013.01);
(Continued)

(58) Field of Classification Search
CPC .............................. B25J 19/0029; H02G 11/00
See application file for complete search history.

(56) References Cited

U.S. PATENT DOCUMENTS 4,695,701 A * 9/1987 Monteith ............... B23K 26/02
219/121.74
6,153,828 A   11/2000 Murata et al.
(Continued)

FOREIGN PATENT DOCUMENTS

CN    102259336 A    11/2011
CN    102458778 A     5/2012
(Continued)

OTHER PUBLICATIONS

European Communication Pursuant to Article 94(3) EPC, European Patent Application No. 14902851.6, dated Nov. 5, 2018, 5 pages.
(Continued)

*Primary Examiner* — Jake Cook
(74) *Attorney, Agent, or Firm* — Taft Stettinius & Hollister LLP; J. Bruce Schelkopf (57) ABSTRACT

The present application discloses a routing unit. A routing unit comprises a first rotation portion, a second rotation portion and one or more baffles; and the routing unit is divided into two or more spaces by the baffles, thereby each space is capable of respectively enclosing a single member therein; wherein the first rotation portion rotates with respect to the second rotation portion; and a first portion of each single member is connected to the first rotation portion and a second portion of each member is connected to the second rotation portion. The present application also provides a rotary joint comprising the routing unit and a robot comprising the rotary joint. Compared with the existing prior arts, embodiments of the proposed solution are compact, easy for assembly or disassembly, and enable a large rotation range.

20 Claims, 13 Drawing Sheets

(51) Int. Cl.
*B25J 18/00* (2006.01)
*B25J 19/00* (2006.01)
*H02G 11/02* (2006.01)
*H02K 7/14* (2006.01)
*H02K 11/00* (2016.01)
*H02K 7/116* (2006.01)

(52) U.S. Cl.
CPC ........... *H02K 7/14* (2013.01); *H02K 11/0094* (2013.01); *H02K 2211/03* (2013.01)

(56) References Cited

U.S. PATENT DOCUMENTS

| | | |
|---|---|---|
| 2010/0237178 A1 | 9/2010 | Nakamura et al. |
| 2010/0278623 A1 | 11/2010 | Blank et al. |
| 2010/0313694 A1 | 12/2010 | Aoki |
| 2011/0290059 A1 | 12/2011 | Pan |
| 2015/0114162 A1* | 4/2015 | Kirihara ............... B25J 19/0029 74/490.02 |
| 2016/0089795 A1* | 3/2016 | Cao ..................... B25J 19/0029 74/490.05 |

FOREIGN PATENT DOCUMENTS

| | | |
|---|---|---|
| EP | 0217336 A1 | 4/1987 |
| GB | 2164506 A | 3/1986 |
| GB | 2491864 A | 12/2012 |
| WO | 2012172287 A1 | 12/2012 |

OTHER PUBLICATIONS

European Patent Office, Examination Report in corresponding application No. 14902851.6, dated Aug. 13, 2019, 6 pp.

State Intellectual Property Office of the P.R. China, International Search Report & Written Opinion issued in corresponding Application No. PCT/CN2014/087489, dated Jan. 6, 2015, 9 pp.

Chinese Office Action, Chinese Patent Application No. 2018062602118000, dated Jun. 29, 2018, 13 pages including Machine Translation in English.

Chinese Search Report, Chinese Patent Application No. 2018062602118000, dated Jun. 29, 2018, 4 pages including Machine Translation in English.

Extended European Search Report, European Patent Application No. 14902851.6, dated Apr. 16, 2018, 7 pages.

* cited by examiner

ROUTING UNIT, A ROTARY JOINT AND A ROBOT

FIELD OF THE INVENTION

Embodiments of the present disclosure generally relate to a routing unit, and particularly relate to a routing unit for use in a rotary joint for a robot.

BACKGROUND OF THE INVENTION

For industrial robots, especially the ones designed to work in limited and complex workspaces, flexibility and compactness are among the major design requirements, and routing plays a more and more important role in the applications of robots.

A robot typically comprises one or more rotary joints in order to achieve flexible positioning of robot arms. Generally, the larger the rotation ranges of rotary joints are, the more flexible a robot is. However, in order to transmit fluid, power and various signals to and from robot arms, one or more air hoses or cables typically go through each rotary joint, and thus it is important to route both the cables and hoses. These hoses or cables cannot bear too much bending and twisting for a long time, which has become one of the major difficulties for large rotation ranges of rotary joints.

Various attempts have been made to solve the problem of routing in limited spaces, for example, cables and hoses go through the tube shaft in the middle, and the drive unit, e.g. motors and gear box sets, are arranged nearby. A variant of tube shafts is the hollow gear boxes. However, one disadvantage of this kind of structure is that the connection between the tube shaft and motor requires the usage of gear box sets or belts. This will introduce additional steps for backlash adjustment, and more risk of component failure. And non-coincident placement of joint axis and drive units require makes the compact design of robot arms more difficult.

Figure 1A:
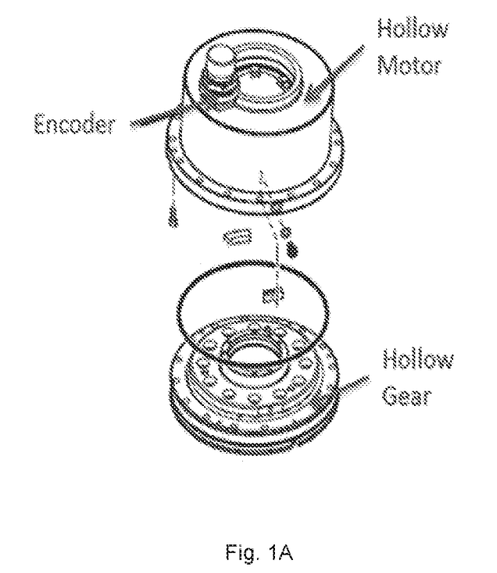
FIG. 1A, FIG. 1B and FIG. 1C show the conventional structures of routing solutions in the rotary joint, respectively.

One improved design to avoid the disadvantages mentioned above is to use special kinds of drive units, e.g. a drive unit including hollow motors and reducers, and with hollow shafts, as shown in FIG. 1A. This kind of component simplifies the structure of joints significantly, and makes the routing more easily. But the cost will be much higher than the common ones.

Figure 1B:
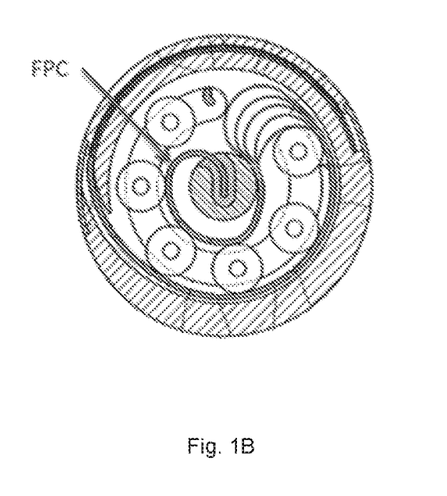

Another solution is using new materials, such as FPC. Less space needed and longer lifetime makes FPC a preferable routing solution, as shown in FIG. 1B. However, the usage of this design could be limited because it doesn't provide routing solutions for air hoses.

Figure 1C:
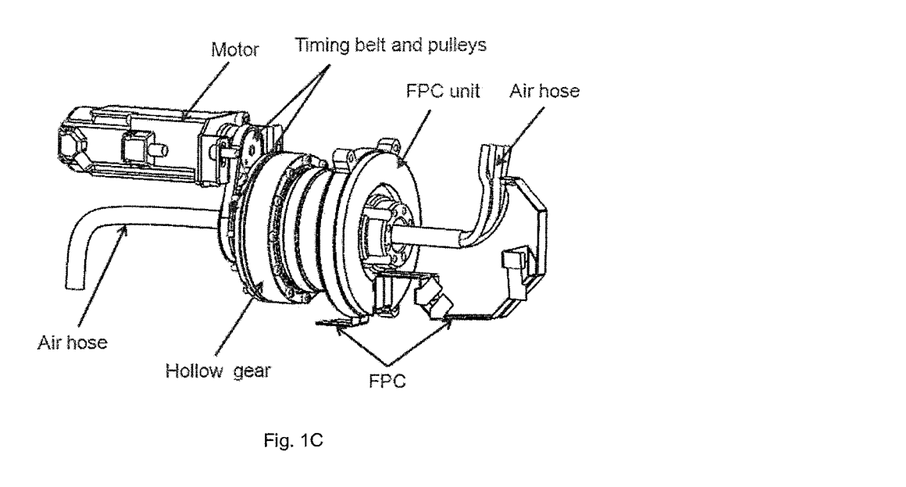

Another developed solution is combining hollow gear box structure and FPC solution. As shown in FIG. 1C, this solution uses FPC to transfer power and signal instead of conventional cables, while let air hose go through the hole of the hollow gear box. It reduces the parts needed to go through the hollow gear box, and use the advantages of FPC, which could help to make the joint compact, cost competitive and flexible. However, it needs a hollow gear and also has the problem of the non-coincident for the axis of the motor and the gear.

In view of the foregoing, there is a need in the art to develop an improved routing structure to route both the cables and hoses, and an improved rotary joint.

SUMMARY OF THE INVENTION

The object of the present invention is to provide a novel routing unit which is compact, easy for assembly or disassembly, and enables a large rotation range.

According to one aspect of the invention, there is provided a routing unit. The routing unit comprises a first rotation portion, a second rotation portion and one or more baffles; and said routing unit is divided into two or more spaces by said baffles, thereby each space is capable of respectively enclosing a single member therein; wherein said first rotation portion rotates with respect to said second rotation portion; and a first portion of each single member is connected to said first rotation portion and a second portion of each member is connected to said second rotation portion.

According to a preferred embodiment of the present invention, said single member is configured to be any one of a flexible printed circuit (FPC) board, a flexible flat cable (FFC), a cable, an air hose or a mechanical stop block.

According to a preferred embodiment of the present invention, said routing unit is divided into one or more FPC spaces, and/or one or more air hose spaces, and/or one or more mechanical stop spaces by said baffles, thereby each space respectively encloses a FPC board, an air hose, or a mechanical stop block.

According to a preferred embodiment of the present invention, said FPC board and said air hose are configured to be in the same space, and the arrangement is said air hose is wrapping outside of said FPC board.

According to a preferred embodiment of the present invention, said FPC board or said FFC is configured to be one layer or more layers.

According to a preferred embodiment of the present invention, said air hose is configured to be one pipe or more pipes.

According to a preferred embodiment of the present invention, said first rotation portion is provided with a hole, and said first portion of said FPC board or said air hose is wound around the hole loosely enough to allow itself to move relative to said second portion of said FPC board or said air hose.

According to a preferred embodiment of the present invention, said FPC board or said air hose is configured to be placed in both sides or only in one side of said routing unit.

According to a preferred embodiment of the present invention, the first rotation portion is provided with a hole, and said mechanical stop block is arc-shaped, to allow itself to slide inside the mechanical stop space.

According to a preferred embodiment of the present invention, the mechanical stop space is provided with at least one limit, to push or stop said mechanical stop block when it slides to a certain position.

According to a preferred embodiment of the present invention, said baffle is configured to be ring-shaped, polygon-shaped or ellipse-shaped.

According to a preferred embodiment of the present invention, said baffle is configured to be ring-shaped, and the radius of the sliding track of the FPC board space is larger, smaller, or equal to the radius of the sliding track of the air hose space.

According to a preferred embodiment of the present invention, said baffle is configured to be continuous or discontinuous.

According to a preferred embodiment of the present invention, said first rotation portion is a first half case and said second rotation portion is a second half case, wherein said first half case rotatably couples to said second half case, thereby forming said routing unit, to enclose said members therein.

According to a preferred embodiment of the present invention, said first rotation portion and said second rotation portion of said routing unit are driven to rotate relative to each other by an actuator.

According to another aspect of the invention, there is provided a rotary joint comprising the routing unit as described above.

According to another aspect of the invention, there is provided a robot comprising the rotary joint as described above.

Compared with the existing prior arts, the solution for routing unit can achieve several advantages as below.

Wide work range: the present invention can achieve a very large rotation range.

Compact: the present invention doesn't need to use a hollow gear box or an arc shaft. The FPC board, the air hose and the mechanical stop block can be integrated together.

Standardized: the present invention can be as a standard part, so it will save time and cost in robot development.

Easy for assembly/disassembly: every rotary joint has a routing unit, so while disassembling, it does not need to disassemble other joint or cable.

Other features and advantages of embodiments of the present application will also be understood from the following description of specific exemplary embodiments when read in conjunction with the accompanying drawings, which illustrate, by way of example, the principles of the invention.

BRIEF DESCRIPTION OF THE DRAWINGS

The above and other features of the present disclosure will become more apparent through detailed explanation on the embodiments as illustrated in the description with reference to the accompanying drawings, throughout which like reference numbers represent same or similar components and wherein.

Throughout the figures, same or similar reference numbers indicate same or similar elements.

DETAILED DESCRIPTION OF PREFERRED EMBODIMENTS

Hereinafter, solutions as provided the present disclosure will be described in details through embodiments with reference to the accompanying drawings. It should be appreciated that these embodiments are presented only to enable those skilled in the art to better understand and implement the present disclosure, not intended to limit the scope of the present disclosure in any manner.

Generally, all terms used in the claims are to be interpreted according to their ordinary meaning in the technical field, unless explicitly defined otherwise herein. All references to "a/an/the/said [element, device, component, means, step, etc]" are to be interpreted openly as referring to at least one instance of said element, device, component, means, unit, step, etc., without excluding a plurality of such devices, components, means, units, steps, etc., unless explicitly stated otherwise. Besides, the indefinite article "a/an" as used herein does not exclude a plurality of such steps, units, modules, devices, and objects, and etc.

In general, embodiments of the present application provide a new routing unit for a rotary joint of a robot. As will be apparent from the further discussions below, one or more separate spaces for enclosing a FPC board, an air hose or a mechanical block stop are employed to provide a routing unit.

A FPC board typically refers to a circuit or wiring structure mounted on a flexible plastic substrate, such as polyimide or polyester film. A type of FPC board contains one or more printed wires for interconnecting electronic components or electronic assemblies either directly or by means of connectors. A FPC board can be as thin as 0.1 mm and can be bent with a bending radius of as small as 1 mm. The FPC board is available to transfer power or signal. An air hose is available to transfer fluid, for example, air.

Throughout the descriptions of various embodiments of the present application, repeated descriptions of some similar elements will be omitted.

Figure 2:
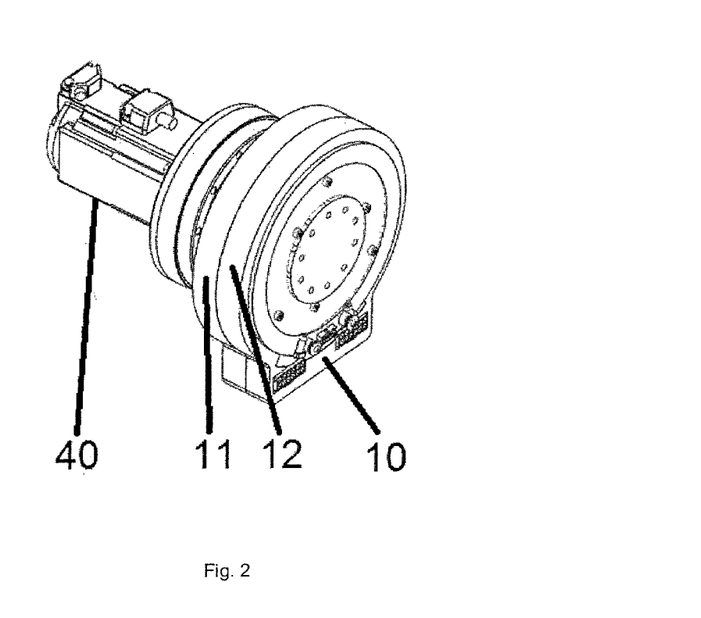
FIG. 2 shows a perspective view of the rotary joint comprising the routing unit according to an embodiment of the present disclosure.
Figure 3:
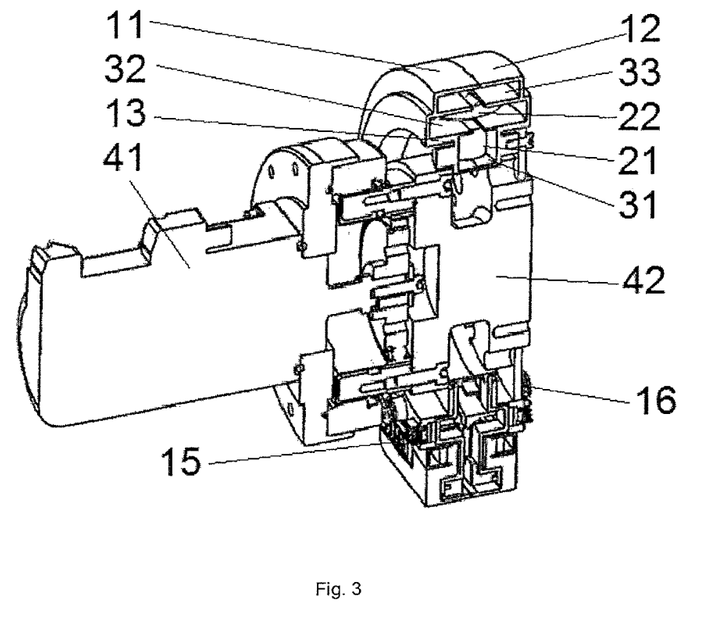
FIG. 3 shows a section view of the rotary joint comprising the routing unit according to an embodiment of the present disclosure.

Next, reference will be made to describe an example of the routing unit in the rotary joint in which the first embodiment of the present disclosure can be implemented. As illustrated in FIGS. 2-3, the actuator 40, for example a motor, is fixed on a flange, and the motor shaft 42 is connected with a gear box as the input, so the gear box output surface is connected with the shaft 42. The routing unit 10 for the rotary joint mainly comprises a first rotation portion 11, a second rotation portion 12 and several baffles 13. The second rotation portion 12 is fixed on the shaft 42 and rotates with it. The first rotation portion 11 is not moving, and it is fixed on the robot casting. So the first rotation portion 11 and the second rotation portion 12 are driven to rotate relative to each other by the motor 41.

In an embodiment of the present application, the first rotation portion 11 is a first half case and the second rotation portion 12 is a second half case. And the first half case rotatably couples to the second half case, thereby forming the routing unit 10.

The routing unit 10 is divided into several spaces 30 by baffles 13, thereby the spaces 30 are capable of enclosing members 20 upon requirement. The advantages of enclosing the members, for example a FPC board 21, an air hose 22 and a mechanical stop block 23, comprise providing electrical isolation to the FPC board 21, providing mechanical protection to the air hose 22, and confining the movement of the mechanical stop block 23, etc. A first portion of each single member 20 is connected to the first rotation portion 11 and a second portion of each member 20 is connected to the second rotation portion 12. The first rotation portion 11 and the second rotation portion 12 are driven to rotate relative to each other by the motor 41. So the first rotation portion 11 of each member 20 rotates with respect to the second rotation portion 12 of each member 20.

Figure 4:
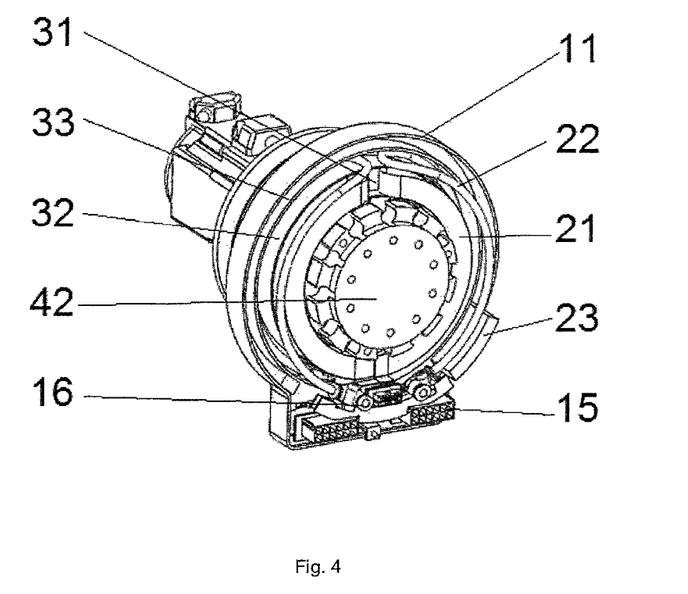
FIG. 4 shows a perspective view of the a first rotation portion of the routing unit according to an embodiment of the present disclosure.
Figure 5:
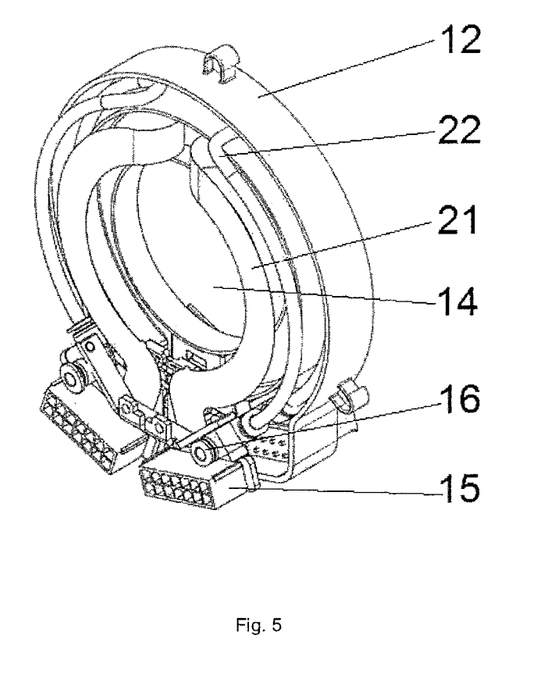
FIG. 5 schematically illustrates an example of the fixing method of the routing unit according to an embodiment of the present disclosure.

In an embodiment of the present application, as shown in FIG. 4, the routing unit 10 is divided into three spaces 30 by two baffles 13, thereby the three spaces 30 are capable of enclosing three members 20 therein. The three spaces 30 are the FPC space 31, the air hose space 32 and the mechanical stop space 33. And the three members 20 are a FPC board 21, an air hose 22 and a mechanical stop block 23, respectively. The FPC board end is connected to the FPC connector 15, while the air hose is connected to the air connector 16 and fixed by this connector.

Therefore, by having several separate spaces, a new routing structure can be designed to achieve a very large rotation range of rotary joint of a robot. And the routing unit 10 can be as a standard part because the FPC board 21, the air hose 22 and the mechanical stop block 23 can be integrated together, so it will save time and cost in robot development and is easy for assembly and disassembly. Furthermore, the routing unit 10 doesn't need to use a hollow gear box or an arc shaft, so it can solve the problems in the prior art.

The above describes one kind of routing unit structure, but the structures of the routing unit are not limited to the above, and it can also adopt, but not limited to, other structures as described below.

For example, the number of the space for the FPC board 21 can be one, two or more than two. The number of the space for the air hose 22 can be one, two or more than two. The number of the space for the mechanical stop block 23 can also be one, two or more than two.

Another embodiment of the present application, in each FPC space 31, the FPC board 21 can be not only one layer, but also more layers, for example, the double-layer FPC board.

Another embodiment of the present application, in each air hose space 3, the air hose 22 can be not only one pipe, but also more pipes.

Another embodiment of the present application, for the routing unit 10, it can integrate the FPC board(s) 21 with the air hose(s) 22, the FPC board(s) 21 with the mechanical stop block(s) 23, or the air hose(s) 22 with the mechanical stop block(s) 23.

Figure 10:
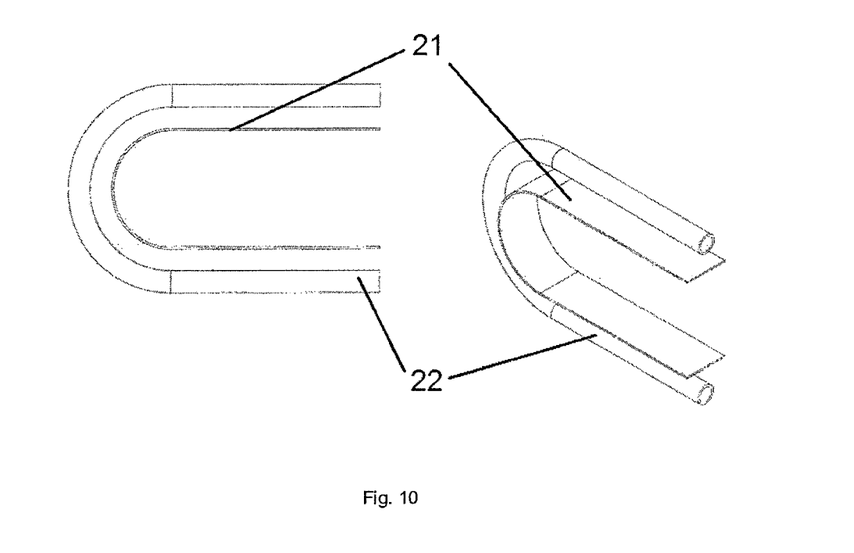
FIG. 10 schematically illustrates an example of the arrangement of the FPC board and the air hose according to an embodiment of the present disclosure.

As shown in FIG. 10, one way to arrange the air hose 22 and the FPC board 21 in the same space is to make the air hose 22 wrap outside of the FPC board 21.

Another embodiment of the present application, the FPC board 21 can also be substituted by a FFC or a cable.

Another embodiment of the present application, the baffle 13 can be continuous or discontinuous.

Figure 6:
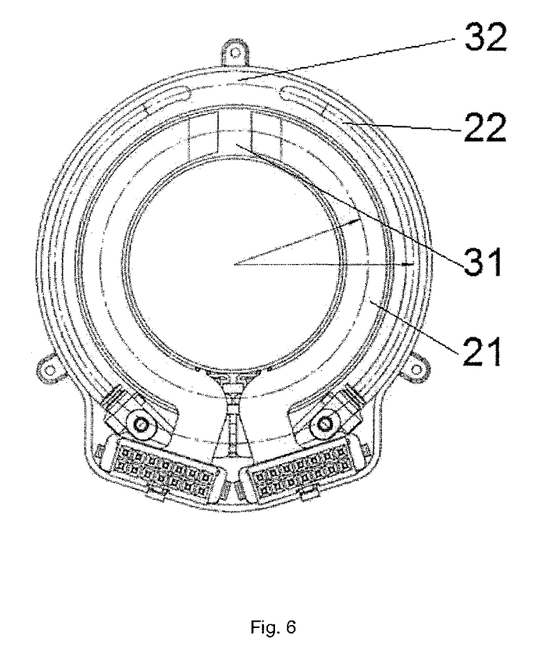
FIG. 6 schematically illustrates an example of the radius comparison of the sliding tracks according to an embodiment of the present disclosure.
Figure 7:
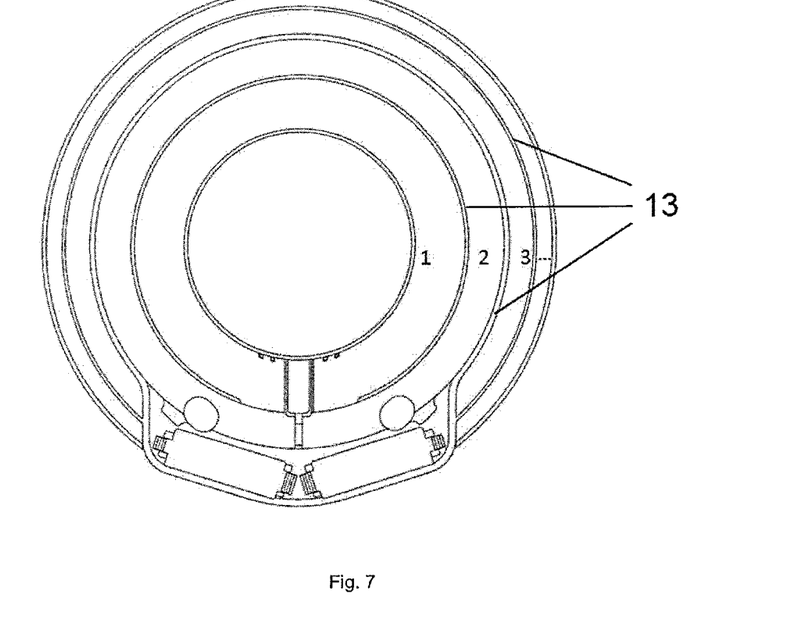
FIG. 7 schematically illustrates an example of the baffles of the routing unit according to an embodiment of the present disclosure.

Another embodiment of the present application, as illustrated in FIG. 6, the baffle 13 can be configured to be ring-shaped, and the radius of the sliding track of the FPC board space 31 can be configured to be not only larger, but also smaller, or equal to the radius of the sliding track of the air hose space 32.

Figure 8:
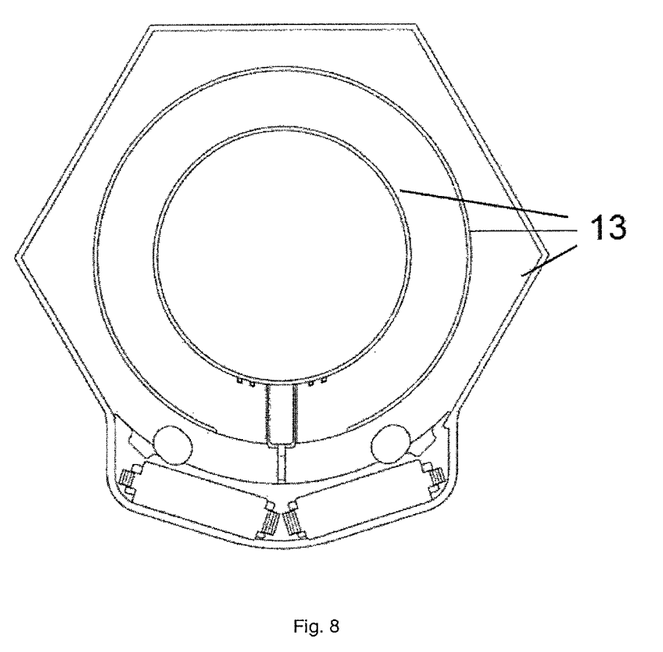
FIG. 8 schematically illustrates another example of the baffles of the routing unit according to an embodiment of the present disclosure.

Another embodiment of the present application, as illustrated in FIG. 8, the baffle 13 can be of any appropriate shape, for example, it can not only be ring-shaped, but also be polygon-shaped or ellipse-shaped, etc. The inner surface of the space 30 preferably has smooth surfaces, so that the member 20 can slide in it smoothly. Furthermore, the inner shape of the space preferably matches the shape of the member 20.

Figure 9:
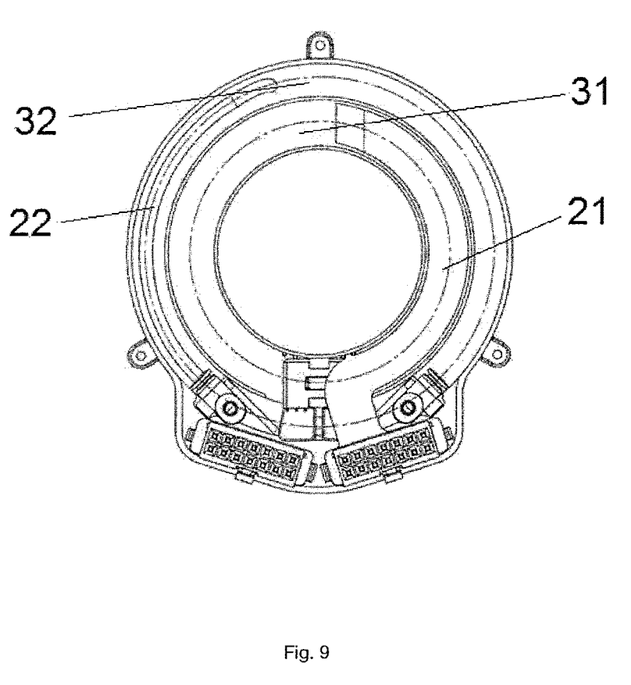
FIG. 9 schematically illustrates an example of the arrangement of the routing unit according to an embodiment of the present disclosure.

Another embodiment of the present application, as illustrated in FIG. 9, the FPC board 21 or the air hose 22 can not only be configured to be placed in both sides, but also only in one side of the routing unit 10.

Hereinafter, to make the skilled in the art to understand the solution as provided in the present disclosure completely and thoroughly, reference will be made to FIGS. 11A to 11D to explain how the FPC board and the air hose works in the routing unit as provided in embodiments of the present disclosure.

As shown in FIGS. 11A to 11D, the ends of the FPC board 21 and the air hose 22 (showed in the black ring of FIG. 11A) are fixed on the first rotation portion 11 and the second rotation portion 12. The FPC board end is connected to the FPC connector 15, while the air hose is connected to the air connector.

Figures 11A, 11B:
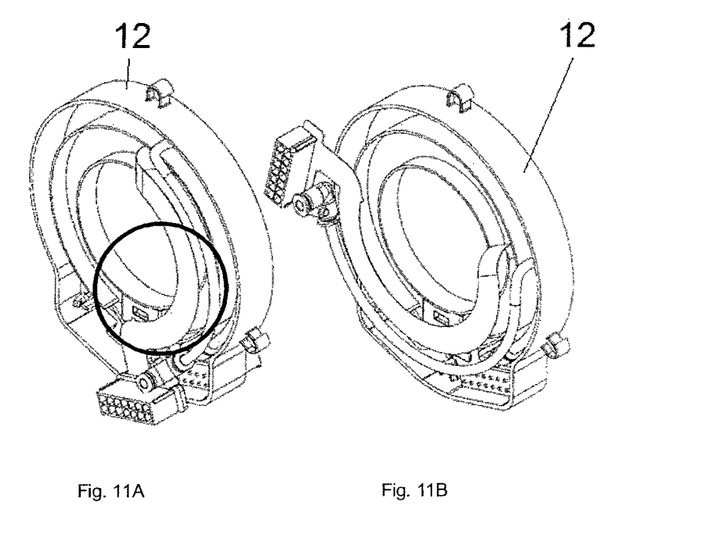
FIG. 11A, FIG. 11B, FIG. 11C and FIG. 11D schematically illustrate how the FPC board and the air hose works in the routing unit according to an embodiment of the present disclosure.
Figure 11C:
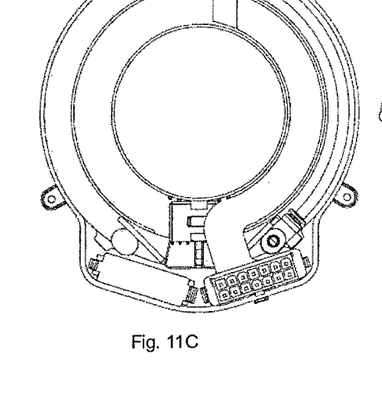
Figure 11D:
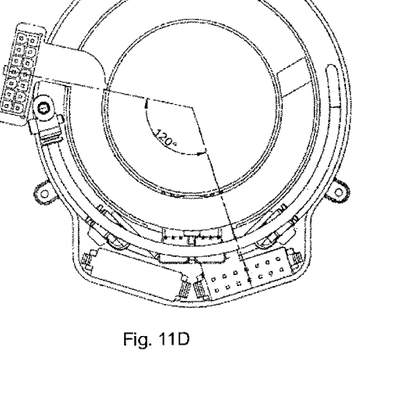

The first portion of the FPC board 21 and the air hose 22 are wound around the hole loosely enough to allow themselves to move relative to the second portion of the FPC board 21 and the air hose 22. A first portion of the FPC board 21 and the air hose 22 is respectively connected to the first rotation portion 11 and a second portion of the FPC board 21 and the air hose 22 is respectively connected to the second rotation portion 12. The first rotation portion 11 and the second rotation portion 12 are driven to rotate relative to each other by the motor 41. When the second rotation portion 12 rotates, the FPC board 21 and the air hose 22 slide in the housing. So the first rotation portion 11 of the FPC board 21 and the air hose 22 is respectively rotates with respect to the second rotation portion 12 of the FPC board 21 and the air hose 22. FIGS. 11A and 11C show the FPC board and the air hose state in 0° position. FIGS. 11B and 11D show they state in 120° position.

Hereinafter, to make the skilled in the art to understand the solution as provided in the present disclosure completely and thoroughly, reference will be made to FIGS. 12A to 12C to explain how the mechanical stop block works in the routing unit as provided in embodiments of the present disclosure.

Figure 12A:
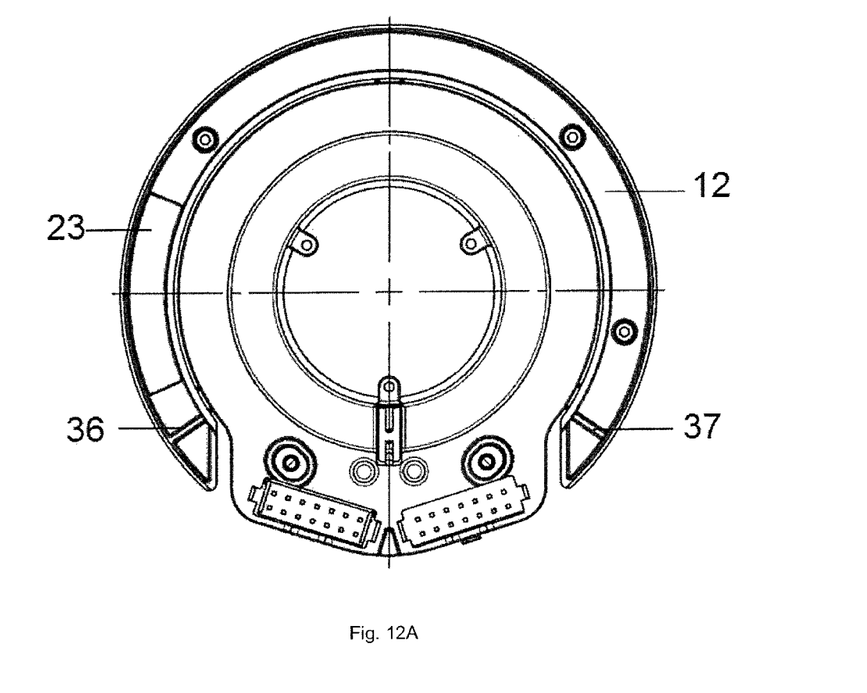
FIG. 12A, FIG. 12B and FIG. 12C schematically illustrate how the mechanical stop block works in the routing unit according to an embodiment of the present disclosure.
Figure 12B:
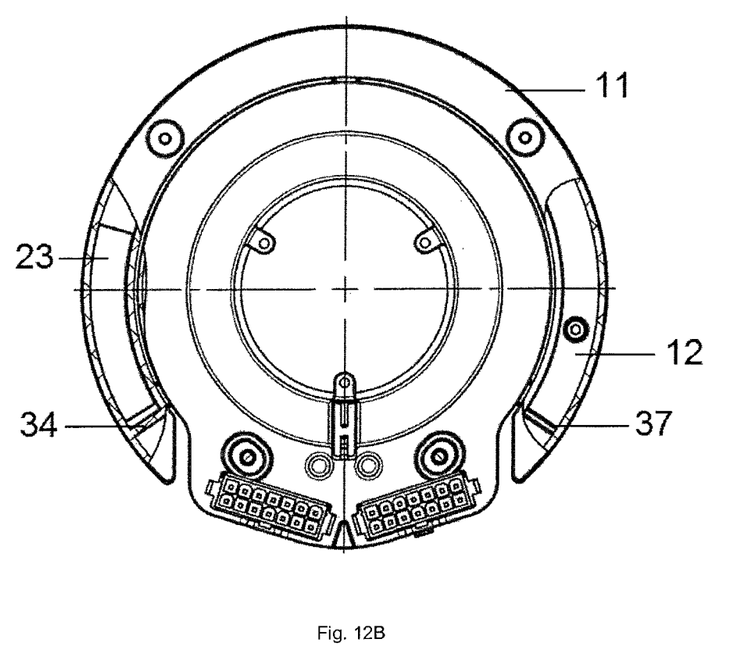
Figure 12C:
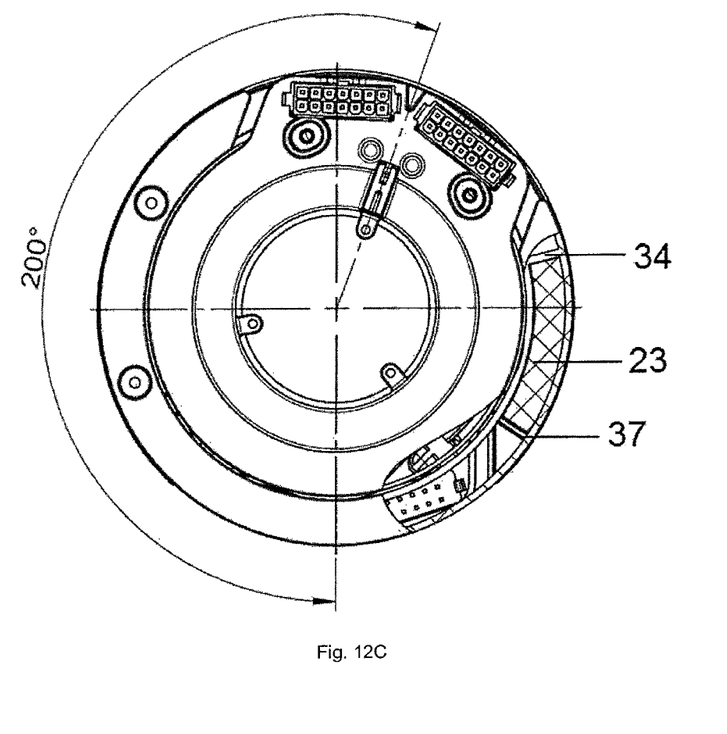

As shown in FIGS. 12A to 12C, the first rotation portion 11 and the second rotation portion 12 form a ring-shaped space with a hole, so the arc-shaped mechanical stop block 23 can slide inside the mechanical stop space. The limit 34 and limit 35 (not shown in the figure) are configured in the first rotation portion 11. The limit 36 and limit 37 are configured in the second rotation portion 12.

FIG. 12A shows an arcuate block 23 in joint housing 2, part of block 23 is in the first rotation portion 11, and another part of the block 23 is in the second rotation portion 12.

FIG. 12B shows in zero position, the block 23 is free in the scope between the limit 34 of the first rotation portion 11 and the limit 37 of the second rotation portion 12.

FIG. 12C shows in the limit position (for example 200° position), the limit 34 pushes the block 23 to slide until the limit 37 stop it.

Therefore, as described above, the limits 34, 35, 36, 37 are available to push or stop the mechanical stop block 23 when it slides to the limit position.

Therefore, by having several separate spaces, a new routing structure can be designed to facilitate compactness and reliability of rotary joint of a robot.

Hereinabove, embodiments of the present disclosure have been described in details through embodiments with reference to the accompanying drawings. It should be appreciated that, while this specification contains many specific implementation details, these details should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purposes of limitation.

The invention claimed is:

1. A routing unit, comprising:
   a first rotation portion, a second rotation portion and one or more baffles; and
   said routing unit is divided into a first space and a second space by said one or more baffles; wherein
   said first rotation portion rotates with respect to said second rotation portion;
   one or more flexible printed circuit (FPC) boards is enclosed within the first space;
   an air hose is enclosed within the second space;
   a first portion of the one or more FPC boards is connected to said first rotation portion and a second portion of the one or more FPC boards is connected to said second rotation portion; and
   a first portion of the air hose is connected to said first rotation portion and a second portion of the air hose is connected to said second rotation portion.

2. The routing unit according to claim 1, wherein, an FPC board and said air hose are configured to be in the second space, and said air hose wrapped outside of said FPC board.

3. The routing unit according to claim 1, wherein, said one or more FPC boards is configured to be one layer or more layers.

4. The routing unit according to claim 1, wherein, said air hose is configured to be one or more pipes.

5. The routing unit according to claim 1, wherein, said first rotation portion is provided with a hole, and said first portion of said one or more FPC boards or said air hose is wound around the hole loosely enough to allow itself to move relative to said second portion of said one or more FPC boards or said air hose.

6. The routing unit according to claim 1, wherein, the first rotation portion is provided with a hole, said routing unit is further divided into a third space by said one or more baffles, a mechanical stop block being enclosed within the third space, and said mechanical stop block is arc-shaped, to allow itself to slide inside the third space.

7. The routing unit according to claim 6, wherein, the third space is provided with at least one limit, to push or stop said mechanical stop block when it slides to a certain position.

8. The routing unit according to claim 1, wherein, said one or more baffles is configured to be ring-shaped, polygon-shaped or ellipse-shaped.

9. The routing unit according to claim 1, wherein, said one or more baffles is configured to be continuous or discontinuous.

10. The routing unit according to claim 1, wherein, said first rotation portion is a first half case and said second rotation portion is a second half case, wherein said first half case rotatably couples to said second half case, thereby forming said routing unit, to enclose said one or more FPC boards and said air hose therein.

11. The routing unit according to claim 1, wherein, said first rotation portion and said second rotation portion of said routing unit are driven to rotate relative to each other by an actuator.

12. A rotary joint comprising the routing unit according to claim 1.

13. A robot comprising the rotary joint according to claim 12.

14. The routing unit according to claim 1, wherein, said one or more FPC boards is alone within the first space.

15. The routing unit according to claim 1, wherein, said air hose is alone within the second space.

16. The routing unit according to claim 1, wherein, a width of the first space is wider than a width of the second space.

17. The routing unit according to claim 1, wherein, said routing unit is further divided into a third space by said one or more baffles, a mechanical stop block being enclosed within the third space.

18. The routing unit according to claim 1, wherein, said one or more FPC boards is alone within the first space, and said air hose is alone within the second space.

19. The routing unit according to claim 18, wherein, a width of the first space is wider than a width of the second space.

20. The routing unit according to claim 19, wherein, said routing unit is further divided into a third space by said one or more baffles, a mechanical stop block being enclosed within the third space.

* * * * *